US010068607B2

(12) United States Patent
Akagi et al.

(10) Patent No.: US 10,068,607 B2
(45) Date of Patent: Sep. 4, 2018

(54) DISK DRIVE MOTOR INCLUDING INNER BOTTOM PLATE GROOVES FOR RECEIVING CONDUCTING WIRES OF STATOR COILS

(71) Applicant: Nidec Corporation, Kyoto (JP)

(72) Inventors: Masahiro Akagi, Kyoto (JP);
Tomohiro Yoneda, Kyoto (JP);
Tadahiro Kuramoto, Kyoto (JP);
Hiroshi Kobayashi, Kyoto (JP);
Masayuki Maeda, Kyoto (JP); Daisuke Moro, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 425 days.

(21) Appl. No.: 14/934,582

(22) Filed: Nov. 6, 2015

(65) Prior Publication Data
US 2016/0254022 A1    Sep. 1, 2016

(30) Foreign Application Priority Data

Feb. 26, 2015   (JP) ................................ 2015-036016

(51) Int. Cl.
*G11B 19/20*   (2006.01)
*G11B 33/12*   (2006.01)
(Continued)

(52) U.S. Cl.
CPC ...... *G11B 19/2009* (2013.01); *G11B 19/2036* (2013.01); *G11B 33/122* (2013.01);
(Continued)

(58) Field of Classification Search
CPC ............ G11B 19/2009; G11B 19/2036; G11B 33/122; G11B 33/1446; H02K 3/28; H02K 3/521
(Continued)

(56) References Cited

U.S. PATENT DOCUMENTS 5,659,213 A * 8/1997 Imashiro .............. G11B 33/122
310/71
8,324,771 B2 * 12/2012 Yawata .................. H02K 5/225
310/43
(Continued)

FOREIGN PATENT DOCUMENTS

JP    2013-78249 A    4/2013

*Primary Examiner* — Jefferson Evans
(74) *Attorney, Agent, or Firm* — Keating & Bennett, LLP

(57) ABSTRACT

A base portion of a motor includes an inner bottom plate portion, a recessed portion and groove portions recessed upward from a lower surface of the inner bottom plate portion, and at least one through hole passing through the inner bottom plate portion in an axial direction. The groove portions extend from the recessed portion toward land portions of a circuit board on a lower surface of the base portion. Conducting wires are drawn out from coils above the base portion to a draw-out surface through the at least one through hole, and are passed through communicating openings and the groove portions to be soldered to the land portions. Each of the at least one through hole is covered with the sealant. Drawing the conducting wires out of the recessed portion through the groove portions prevents the sealant in the recessed portion from overflowing toward the land portions.

19 Claims, 11 Drawing Sheets

(51) Int. Cl.
 *H02K 3/52* (2006.01)
 *G11B 33/14* (2006.01)
 *H02K 3/28* (2006.01)

(52) U.S. Cl.
 CPC ........... *G11B 33/1446* (2013.01); *H02K 3/28* (2013.01); *H02K 3/521* (2013.01)

(58) Field of Classification Search
 USPC ............... 360/98.07, 99.08, 99.16, 99.25
 See application file for complete search history.

(56) References Cited

U.S. PATENT DOCUMENTS

| | | | |
|---|---|---|---|
| 8,400,729 B1 | 3/2013 | Watanabe | |
| 8,675,305 B2 | 3/2014 | Watanabe et al. | |
| 8,908,324 B1 | 12/2014 | Taki et al. | |
| 8,964,329 B2 | 2/2015 | Taki et al. | |
| 9,935,528 B2* | 4/2018 | Yoneda | H02K 5/225 |
| 2008/0218010 A1 | 9/2008 | Hino et al. | |
| 2009/0316299 A1 | 12/2009 | Tashiro et al. | |
| 2010/0148639 A1* | 6/2010 | Lee | G11B 19/2009 |
| | | | 310/68 D |
| 2010/0231068 A1 | 9/2010 | Yamazaki et al. | |
| 2010/0329104 A1* | 12/2010 | Yawata | H02K 5/225 |
| | | | 369/264 |
| 2012/0075746 A1 | 3/2012 | Yoneda et al. | |
| 2012/0113546 A1 | 5/2012 | Sugi et al. | |
| 2012/0153750 A1* | 6/2012 | Kim | H02K 3/522 |
| | | | 310/71 |
| 2012/0182645 A1 | 7/2012 | Kurokawa et al. | |
| 2013/0006946 A1 | 1/2013 | Prahlad et al. | |
| 2013/0031773 A1 | 2/2013 | Matsuyama et al. | |
| 2013/0234550 A1 | 9/2013 | Yamazaki et al. | |
| 2014/0139949 A1* | 5/2014 | Kodama | G11B 19/2045 |
| | | | 360/99.08 |
| 2014/0153132 A1* | 6/2014 | Sato | H02K 3/50 |
| | | | 360/99.08 |
| 2014/0362469 A1* | 12/2014 | Taki | H02K 3/28 |
| | | | 360/99.08 |
| 2014/0362470 A1* | 12/2014 | Taki | H02K 3/522 |
| | | | 360/99.08 |
| 2015/0022919 A1 | 1/2015 | Matsuyama et al. | |
| 2015/0036475 A1* | 2/2015 | Shiraishi | G11B 19/2036 |
| | | | 369/258.1 |
| 2015/0318756 A1* | 11/2015 | Jang | F04D 25/088 |
| | | | 310/90 |
| 2016/0078894 A1* | 3/2016 | Park | G11B 19/2009 |
| | | | 360/99.08 |
| 2016/0254022 A1* | 9/2016 | Akagi | G11B 19/2009 |
| | | | 369/258.1 |

\* cited by examiner

DISK DRIVE MOTOR INCLUDING INNER BOTTOM PLATE GROOVES FOR RECEIVING CONDUCTING WIRES OF STATOR COILS

BACKGROUND OF THE INVENTION

1. Field of the Invention

The present invention relates to a motor and a disk drive apparatus.

2. Description of the Related Art

Spindle motors arranged to rotate disks are typically installed in hard disk apparatuses and optical disk apparatuses. Such a spindle motor includes a stationary portion fixed to a housing of the apparatus, and a rotating portion arranged to rotate while supporting the disk(s). The spindle motor is arranged to generate a torque centered on a central axis through magnetic flux generated between the stationary portion and the rotating portion, so that the rotating portion is caused to rotate with respect to the stationary portion.

A known spindle motor is described in, for example, JP-A 2013-78249. The spindle motor described in JP-A 2013-78249 includes a base member, coils, and a flexible circuit board. Lead wires drawn out from the coils are passed through an opening hole passing through the base member, and are connected to the flexible circuit board through solders (see paragraph of JP-A 2013-78249).

In the spindle motor described in JP-A 2013-78249, the opening hole of the base member is sealed with a curable resin to prevent entrance and exit of gas through the opening hole (see paragraph [0028] of JP-A 2013-78249).

It is preferable to not only fill the curable resin, i.e., a sealant, into the opening hole but also cover an end opening of the opening hole with a sealant to more securely seal the opening hole, which is a through hole. However, if a sufficient amount of sealant to cover the end opening of the opening hole is applied to a lower surface of the base member in a process of manufacturing the spindle motor, the sealant may spread and flow out to a surrounding area on the lower surface of the base member before the sealant is cured.

SUMMARY OF THE INVENTION

A motor according to a preferred embodiment of the present invention includes a stationary portion, and a rotating portion supported to be rotatable about a central axis extending in a vertical direction. The stationary portion includes a metallic base portion including an annular inner bottom plate portion; a stator arranged above the inner bottom plate portion; and a circuit board arranged on a lower surface of the base portion, and including a plurality of land portions. The base portion includes a recessed portion recessed upward from a lower surface of the inner bottom plate portion; a plurality of groove portions recessed upward from the lower surface of the inner bottom plate portion, and arranged to extend from the recessed portion toward the land portions; and at least one through hole arranged to pass through the inner bottom plate portion in an axial direction. The recessed portion includes a draw-out surface arranged to extend substantially parallel to the lower surface of the inner bottom plate portion at a level higher than that of the lower surface of the inner bottom plate portion, and having a lower opening of each of the at least one through hole defined therein; and a wall surface arranged to extend axially downward from a peripheral portion of the draw-out surface. The wall surface includes a plurality of communicating openings each of which is in communication with one end of a separate one of the groove portions. A plurality of conducting wires are drawn out from coils of the stator to the draw-out surface through the at least one through hole, and are passed through the communicating openings and the groove portions to be soldered to the land portions. The recessed portion has a sealant arranged therein. The lower opening of each of the at least one through hole is covered with the sealant.

According to the above preferred embodiment of the present invention, the likelihood that the sealant arranged in the recessed portion will overflow toward the land portions is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, disk drive apparatuses and motors according to preferred embodiments of the present invention will be described. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a stator is arranged with respect to a base portion is an upper side, and the shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

1. First Preferred Embodiment 1-1. Structure of Disk Drive Apparatus

Figure 1:
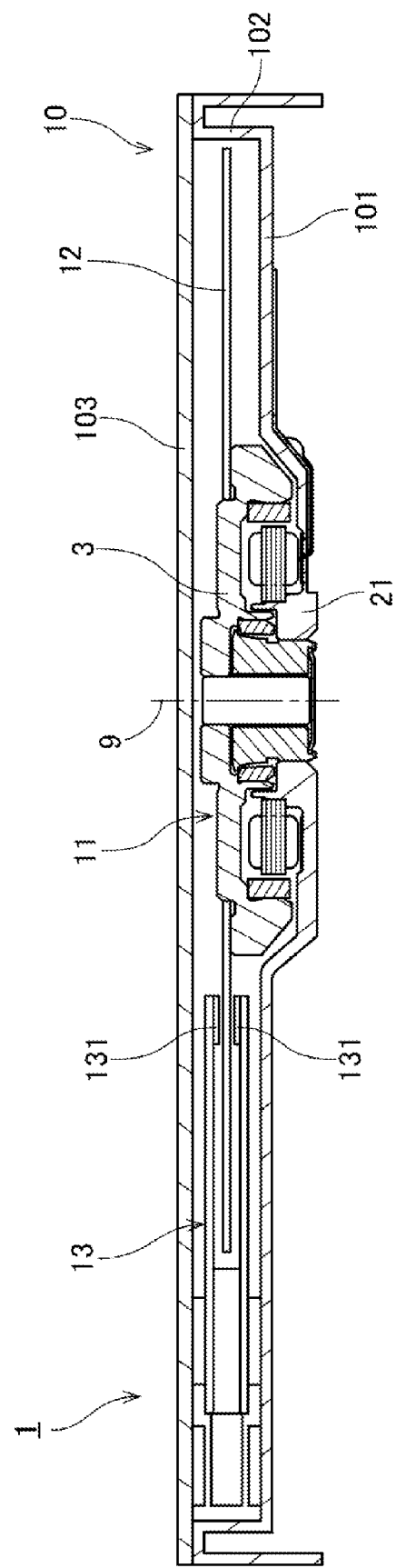
FIG. 1 is a vertical cross-sectional view of a disk drive apparatus according to a preferred embodiment of the present invention.

FIG. 1 is a vertical cross-sectional view of a disk drive apparatus 1 including a motor 11 according to a first preferred embodiment of the present invention. The disk drive apparatus 1 is, for example, an apparatus arranged to perform reading and writing of information from or to a magnetic disk 12 while rotating the magnetic disk 12. Referring to FIG. 1, the disk drive apparatus 1 includes the motor 11, the magnetic disk 12, an access portion 13, and a housing 10.

The motor 11 is arranged to rotate the magnetic disk 12 about a central axis 9 while supporting the magnetic disk 12. The motor 11 includes a base portion 21 arranged to extend perpendicularly to the central axis 9.

The housing 10 includes a lower plate portion 101, a wall portion 102, and an upper plate portion 103. The lower plate portion 101 is arranged to extend perpendicularly to the central axis 9. The lower plate portion 101 includes the base portion 21 of the motor 11. The wall portion 102 is tubular, and is arranged to extend upward from the lower plate portion 101. The upper plate portion 103 is arranged to cover an upper opening of the wall portion 102.

An interior space of the housing 10 is preferably a clean space with extremely little dirt or dust. In the disk drive apparatus 1, the interior space of the housing 10 is filled with a helium gas. Thus, resistance of gas against rotation of a rotating portion 3 of the motor 11 and the magnetic disk 12 and movement of the access portion 13 is reduced, while cleanliness of the interior space of the housing 10 is maintained.

Note that the interior space of the housing 10 may be filled with a hydrogen gas, a nitrogen gas, or clean air, instead of the helium gas. Also note that the interior space of the housing 10 may alternatively be filled with a mixture of air and any of the helium gas, the hydrogen gas, and the nitrogen gas.

The rotating portion 3 of the motor 11, the magnetic disk 12, and the access portion 13 are accommodated in the housing 10. The access portion 13 is arranged to move heads 131 along recording surfaces of the magnetic disk 12 to perform the reading and the writing of information from or to the magnetic disk 12.

Note that the number of magnetic disks 12 included in the disk drive apparatus 1 may alternatively be more than one.

Also note that the access portion 13 may alternatively be arranged to perform only one of the reading and the writing of information from or to the magnetic disk(s) 12.

1-2. Structure of Motor

Figure 2:
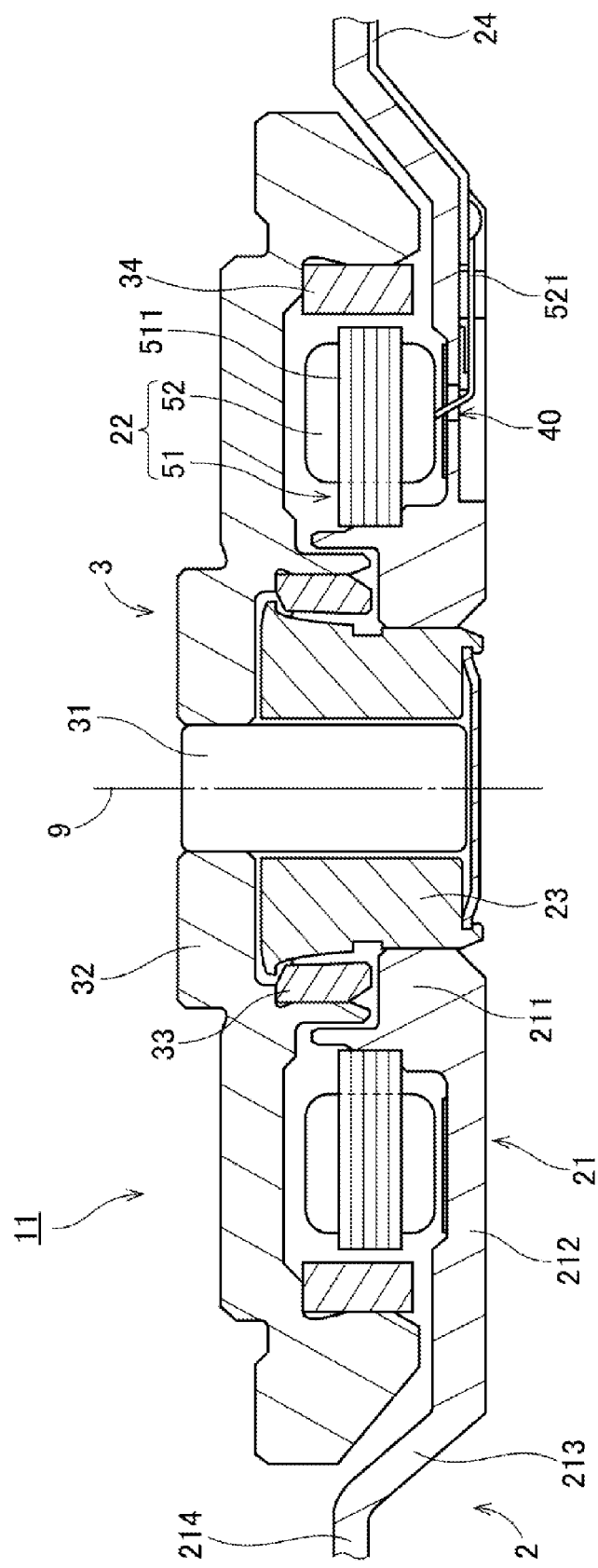
FIG. 2 is a vertical cross-sectional view of a motor according to the above preferred embodiment of the present invention.

Next, the structure of the motor 11 will now be described in more detail below. FIG. 2 is a vertical cross-sectional view of the motor 11. The motor 11 is a three-phase brushless motor, but may alternatively be another type of motor.

Referring to FIG. 2, the motor 11 includes a stationary portion 2 and the rotating portion 3. The stationary portion 2 is arranged to be stationary relative to the housing of the disk drive apparatus 1. The rotating portion 3 is supported to be rotatable with respect to the stationary portion 2.

The stationary portion 2 includes the base portion 21, which is made of a metal, a stator 22, a stationary bearing unit 23, and a circuit board 24.

The base portion 21 is arranged to extend perpendicularly to the central axis 9 below the rotating portion 3, the magnetic disk 12, and the access portion 13. The base portion 21 is produced by, for example, subjecting a metallic plate material to press working. Note that the base portion 21 may alternatively be produced by another method, such as, for example, casting or a cutting process. The base portion 21 is defined integrally with the wall portion 102 of the housing 10 of the disk drive apparatus 1, but the base portion 21 and the wall portion 102 may alternatively be defined by a plurality of components.

The base portion 21 includes a cylindrical portion 211, an inner bottom plate portion 212, an inclined portion 213, and an outer bottom plate portion 214. The cylindrical portion 211 is cylindrical, and is arranged to extend along the central axis 9. The inner bottom plate portion 212 is substantially annular, and is arranged to extend radially outward from a lower end of the cylindrical portion 211 below the stator 22. The inclined portion 213 is arranged to extend obliquely upward and radially outward from an outer edge of the inner bottom plate portion 212. The outer bottom plate portion 214 is arranged to extend radially outward from an outer edge of the inclined portion 213. That is, the outer bottom plate portion 214 is arranged at a level higher than that of the inner bottom plate portion 212.

In addition, the base portion 21 includes through holes 40 each of which is arranged to pass through the inner bottom plate portion 212 in an axial direction. In this motor 11, the number of through holes 40 is four, the same number as the number of conducting wires 521, which will be described below.

The stator 22 includes a stator core 51 and a plurality of coils 52. The stator core 51 and the coils 52 are arranged above the inner bottom plate portion 212. The stator core 51 is fixed to an outer circumferential surface of the cylindrical portion 211. The stator core 51 includes a plurality of teeth 511 arranged to project radially outward. Each coil 52 is defined by a conducting wire wound around a separate one of the teeth 511. Each of the conducting wires 521, which extend from the coils 52, is drawn out downwardly of a lower surface of the inner bottom plate portion 212 through a separate one of the through holes 40.

The stationary bearing unit 23 is arranged radially inside of the cylindrical portion 211 of the base portion 21. A lower end portion of a shaft 31, which will be described below, is accommodated inside the stationary bearing unit 23.

The circuit board 24 is arranged on a lower surface of the base portion 21. A flexible printed circuit board, which has flexibility, is used as the circuit board 24. Thus, the circuit board 24 can be arranged along the uneven lower surface of the base portion 21. In addition, use of the flexible printed circuit board leads to a reduction in the axial thickness of the circuit board 24 compared to the case where a circuit board of another type is used.

The conducting wires 521, which are drawn out from the coils 52 through the through holes 40, are electrically connected to the circuit board 24. Electric drive currents for the motor 11 are supplied from an external power supply to the coils 52 through the circuit board 24.

The rotating portion 3 is supported to be rotatable about the central axis 9. The rotating portion 3 includes the shaft 31, a hub 32, an annular member 33, and a magnet 34.

The shaft 31 is a columnar member arranged to extend in the axial direction. An upper end portion of the shaft 31 is arranged to project above the stationary bearing unit 23.

The hub 32 is arranged to extend radially outward from a periphery of the upper end portion of the shaft 31. An inner circumferential portion of the hub 32 is fixed to the upper end portion of the shaft 31. The magnetic disk 12 is supported by an upper surface of the hub 32.

The annular member 33 is fixed to the hub 32 on a lower side of the hub 32. An inner circumferential surface of the annular member 33 is arranged radially opposite to an outer circumferential surface of the stationary bearing unit 23.

A lubricating fluid is arranged between the stationary bearing unit 23 and a combination of the shaft 31, the hub 32, and the annular member 33. The rotating portion 3 is thus supported to be rotatable with respect to the stationary portion 2 through the lubricating fluid.

The magnet 34 is arranged radially outside of the stator 22, and is fixed to the hub 32. An inner circumferential surface of the magnet 34 is arranged radially opposite to a radially outer end surface of each of the teeth 511.

Once, in the motor 11 described above, the electric drive currents are supplied to the coils 52 through the circuit board 24, magnetic flux is generated around each of the teeth 511. Then, interaction between the magnetic flux of the teeth 511 and magnetic flux of the magnet 34 produces a circumferential torque, so that the rotating portion 3 is caused to rotate about the central axis 9 with respect to the stationary portion 2. The magnetic disk 12 supported by the hub is caused to rotate about the central axis 9 together with the rotating portion 3.

1-3. Paths of Conducting Wires from Coils to Land Portions

Figure 3:
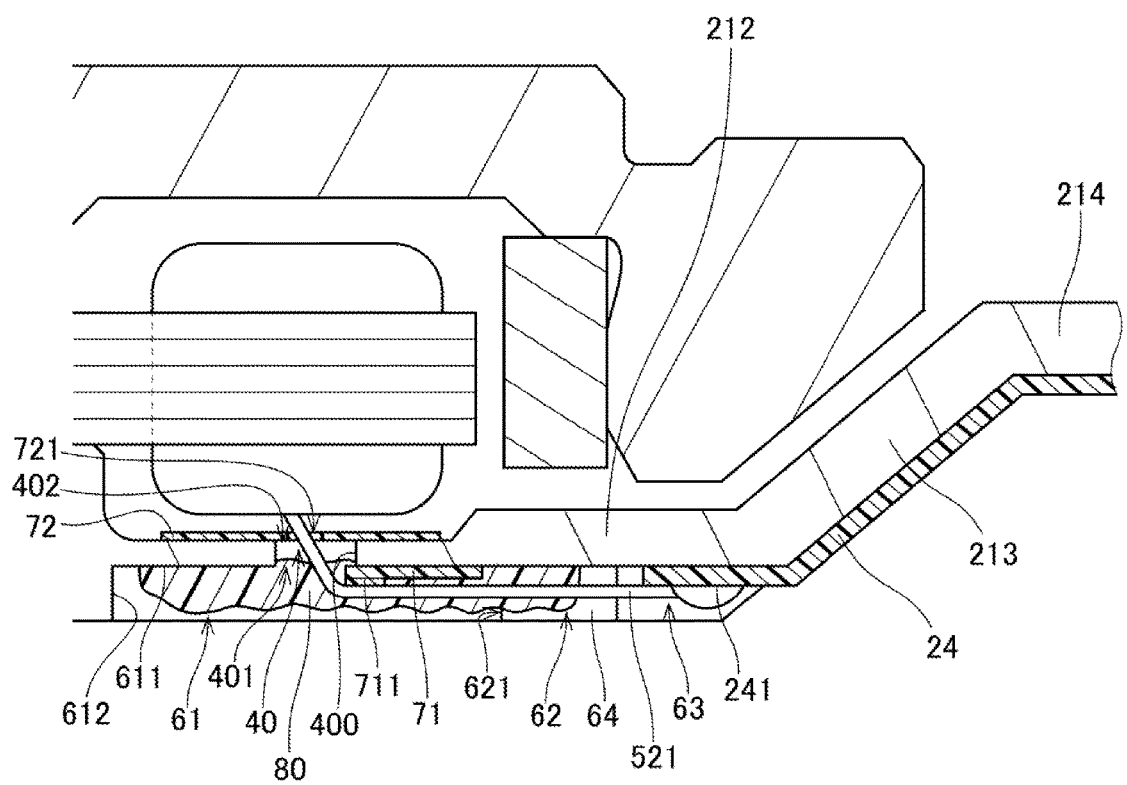
FIG. 3 is a partial vertical cross-sectional view of the motor according to the above preferred embodiment of the present invention.
Figure 4:
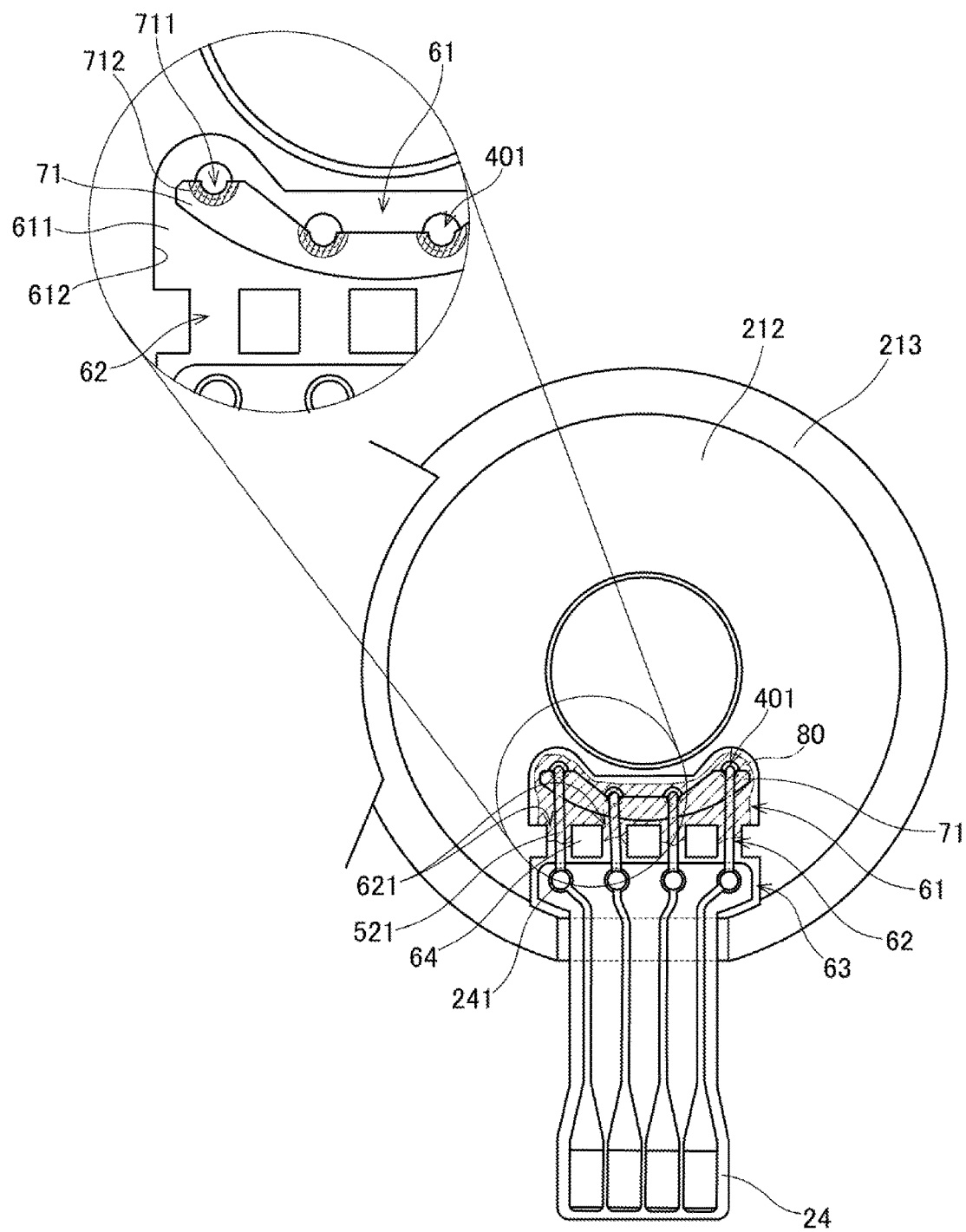
FIG. 4 is a partial bottom view of a base portion according to the above preferred embodiment of the present invention.

Next, paths of the conducting wires 521 from the coils 52 to land portions 241 will now be described in detail below. FIG. 3 is a partial vertical cross-sectional view of the motor 11. FIG. 4 is a partial bottom view of the motor 11. In FIG. 4, a sealant 80 is hatched with chain lines. In an enlarged view in FIG. 4, the conducting wires 521 and the sealant 80 are not shown.

Referring to FIGS. 3 and 4, the base portion 21 includes a recessed portion 61, four groove portions 62, and a connection portion 63. Each of the recessed portion 61, the four groove portions 62, and the connection portion 63 is recessed upward from the lower surface of the inner bottom plate portion 212. The recessed portion 61, the groove portions 62, and the connection portion 63 are defined by, for example, subjecting the base portion 21 obtained by the press working to a cutting process. Use of the cutting process makes it possible to define the recessed portion 61, the groove portions 62, and the connection portion 63 with higher precision than when another method such as, for example, press working or a casting process is used. Note that the recessed portion 61, the groove portions 62, and the connection portion 63 may alternatively be defined by only press working or only a casting process. Also note that the recessed portion 61, the groove portions 62, and the connection portion 63 may alternatively be roughly shaped by a casting process and then finally shaped by a cutting process.

The recessed portion 61 includes a draw-out surface 611 and a wall surface 612. The draw-out surface 611 is arranged to extend substantially parallel to the lower surface of the inner bottom plate portion 212 at a level higher than that of the lower surface of the inner bottom plate portion 212. A lower opening 401 of each of the four through holes 40 is defined in the draw-out surface 611. The wall surface 612 is a surface which extends axially downward from a peripheral portion of the draw-out surface 611 to the lower surface of the inner bottom plate portion 212.

Each of the four groove portions 62 is arranged to extend from the recessed portion 61 toward a corresponding one of the land portions 241, which will be described below, of the circuit board 24. Each of the four groove portions 62 has one end joined to the recessed portion 61 and an opposite end joined to the connection portion 63. The wall surface 612 of the recessed portion 61 includes four communicating openings 621 each of which is in communication with the one end of a corresponding one of the four groove portions 62.

Referring to FIG. 4, the base portion 21 includes three projecting portions 64. Between two circumferentially adjacent ones of the groove portions 62, each projecting portion is arranged to project downward relative to the draw-out surface 611 and upper ends of the groove portions 62. A radially inner surface of each projecting portion 64 defines a portion of the wall surface 612 of the recessed portion 61.

The circuit board 24 includes the land portions 241, which are preferably four in number and include conductive pad surfaces, to which the conducting wires 521 are soldered. The circuit board 24 is arranged on the lower surface of the base portion 21, and extends over portions of the inner bottom plate portion 212, the inclined portion 213, and the outer bottom plate portion 214. In this motor 11, the four land portions 241 of the circuit board 24 are arranged in the connection portion 63.

In this motor 11, the number of conducting wires 521 drawn out through the through holes 40 is four, and the four conducting wires 521 are used for a U phase, a V phase, a W phase, and common, respectively. Note that the conducting wire used for the common is made up of three conducting wires twisted together to define one cable, and the three conducting wires as a whole are regarded as a single conducting wire. Referring to FIG. 4, in this motor 11, the base portion 21 includes the four through holes 40. Each of the four conducting wires 521 is drawn out to the draw-out surface 611 through a separate one of the four through holes 40. Each of the four conducting wires 521 is then passed through the corresponding communicating opening 621 and the corresponding groove portion 62, and is soldered to the corresponding land portion 241 of the circuit board 24.

The stationary portion 2 includes a first insulation sheet 71 and a second insulation sheet 72. The first insulation sheet 71 is arranged on the draw-out surface 611. The first insulation sheet 71 is fixed to the draw-out surface 611 through an adhesive or a gluing agent. Meanwhile, the second insulation sheet 72 is arranged on an upper surface of the inner bottom plate portion 212. The second insulation sheet 72 is fixed to the upper surface of the inner bottom plate portion 212 through an adhesive or a gluing agent. A resin, such as polyethylene terephthalate (PET) or the like, which is an insulating material, is used as a material of each of the first insulation sheet 71 and the second insulation sheet 72, for example. Note that the second insulation sheet 72 may alternatively be arranged on the upper surface of the inner bottom plate portion 212 without use of the adhesive or the gluing agent.

A large part of a surface of the base portion 21 is covered with an insulating layer made of an insulating resin as a result of an electrodeposition process. Note that this insulating layer may alternatively be formed by powder coating. In this motor 11, the first insulation sheet 71 is arranged to cover a portion of the lower opening 401 of each through hole 40, whereas the second insulation sheet 72 is arranged to cover a portion of an upper opening 402 of each through hole 40. This contributes to preventing each conducting wire 521 from making contact with a wall surface 400 of the base portion 21 which defines the corresponding through hole 40.

Note here that the wall surface 400 may or may not be covered with the insulating layer. For example, in the case where the through hole 40 is defined after the surface of the base portion 21 is coated with the insulating layer by the electrodeposition process, the wall surface 400 is not covered with the insulating layer. When the wall surface 400 is not covered with the insulating layer, use of the first insulation sheet 71 and the second insulation sheet 72 to prevent a contact between the conducting wire 521 and the wall surface 400 is particularly important.

The first insulation sheet 71 is arranged between the draw-out surface 611 and portions of the conducting wires 521 which lie in the recessed portion 61. As illustrated in the enlarged view in FIG. 4, a radially inner edge portion of the first insulation sheet 71 includes four arc-shaped cuts 711 at positions axially overlapping with the lower openings 401 of the through holes 40.

In addition, referring to FIGS. 3 and 4, the first insulation sheet 71 has an increased thickness portion 712 around every cut 711, the increased thickness portion 712 having a greater axial thickness than that of a remaining portion of the first insulation sheet 71. The increased thickness portion 712 is arranged to overlap with the lower opening 401 of the corresponding through hole 40 and an edge portion of the lower opening 401. The increased thickness portion 712 provided in the first insulation sheet 71 contributes to preventing the first insulation sheet 71 from being deformed at a point of contact between the conducting wire 521 and the first insulation sheet 71. This in turn contributes to more effectively preventing the conducting wire 521 from making contact with the wall surface 400.

The second insulation sheet 72 is arranged between the inner bottom plate portion 212 and the coils 52. This prevents a contact between the base portion 21 and the coils 52. That is, electrical isolation between the base portion 21 and the coils 52 is achieved.

In addition, the second insulation sheet 72 includes insulation holes 721, each of which passes therethrough in the axial direction, at positions axially overlapping with or over the upper openings 402 of the through holes 40. Each of the conducting wires 521 drawn out from the coils 52 extends toward a space below the lower surface of the base portion 21 through the corresponding insulation hole 721 and the corresponding through hole 40. Each insulation hole 721 is arranged in the upper opening 402 of the corresponding through hole 40 when viewed in the axial direction. This prevents the conducting wire 521 from making contact with an edge portion of the upper opening 402 of the through hole 40.

In this motor 11, the plurality of openings 401 are defined in the draw-out surface 611, and the single first insulation sheet 71 is arranged on the draw-out surface 611. Preferably, four openings 401 are defined in the draw-out surface 611. The first insulation sheet 71 is arranged to cover a portion of each of the plurality of openings 401. Preferably, the first insulation sheet 71 is arranged to cover portions of the edge portions of all the four openings 401. Thus, the number of steps of sticking insulation sheets on the draw-out surface 611 in a process of manufacturing the motor 11 is smaller than in the case where a separate first insulation sheet 71 is provided for each of the openings 401. That is, efficiency with which the motor is assembled is improved.

Referring to FIG. 3, the sealant 80 is arranged in the recessed portion 61. A resin, for example, is used as the sealant 80. More specifically, a thermosetting adhesive, for example, is used as the sealant 80. As described below, in the process of manufacturing the motor 11, the sealant 80 in a fluid state is applied to the recessed portion 61, and thereafter, the sealant 80 is cured. In this motor 11, before the sealant 80 is cured, a portion of the sealant 80 enters from the recessed portion 61 into each groove portion 62 through the corresponding communicating opening 621. Thus, after the sealant 80 is cured, a portion of the sealant 80 is held in the recessed portion 61, and another portion of the sealant 80 is held in each groove portion 62. In addition, the portion of the sealant 80 held in the recessed portion 61 is continuous with the portion of the sealant 80 held in each groove portion 62.

Before the sealant 80 is cured, a surface of the portion of the sealant 80 arranged in each groove portion 62 is held by surface tension in relation to an upper surface and side surfaces of the groove portion 62 and a surface of the conducting wire 521 arranged in the groove portion 62.

The lower opening 401 of each through hole 40 is covered with the sealant 80. Thus, the sealant 80 contributes to preventing entrance and exit of gas through each through hole 40. This in turn contributes to preventing the helium gas arranged inside the disk drive apparatus 1 from leaking out of the disk drive apparatus 1, and to preventing external air from entering into the disk drive apparatus 1. In addition, the sealant 80 serves to fix the conducting wires 521 inside the recessed portion 61. This contributes to preventing each conducting wire 521 from protruding downward below the lower surface of the base portion 21.

Referring to FIG. 4, in this motor 11, the sealant 80 is arranged to cover an edge portion of the first insulation sheet 71. Preferably, the sealant 80 is arranged to cover the entire edge portion of the first insulation sheet 71. Thus, even if a gap is defined between an upper surface of the first insulation sheet 71 and the draw-out surface 611, no through hole 40 will come into communication with a space outside of the disk drive apparatus 1 through the gap. Thus, an effect of the sealing with the sealant 80 is improved.

In the process of manufacturing the motor 11, the sealant 80 is applied to the recessed portion 61 in a situation in which the lower surface of the base portion 21 faces upward in the vertical direction. Then, in this situation, the sealant 80 is heated and cured. During the above step of applying the sealant 80 and the above step of curing the sealant 80, the sealant 80 may overflow into a surrounding area before being cured. In this motor 11, the wall surface 612 is arranged to be perpendicular to the draw-out surface 611. This contributes to preventing the sealant 80 arranged on the draw-out surface 611 from flowing out of the recessed portion 61 through the wall surface 612. That is, the likelihood that the sealant 80 arranged in the recessed portion 61 will overflow toward the land portions 241 is reduced.

In addition, the groove portions 62 are provided in the base portion 21, and if each groove portion 62 has a large circumferential width, the sealant 80 applied to the recessed portion 61 may flow radially outward through the groove portion 62. However, in this motor 11, the combined circumferential width of all the four groove portions 62 is smaller than the circumferential width of the recessed portion 61. In addition, an interspace between adjacent ones of the communicating openings 621 has a width greater than the width of each communicating opening 621. This contributes to preventing the sealant 80 applied to the recessed portion 61 from flowing radially outward through any communicating opening 621 and the corresponding groove portion 62.

The radially inner surface of each projecting portion 64, which is arranged between adjacent ones of the groove portions 62, defines a portion of the wall surface 612 of the recessed portion 61. The radially inner surface of the projecting portion 64 is arranged to extend substantially perpendicularly to the draw-out surface 611. This contributes to more effectively preventing the sealant 80 applied to the draw-out surface 611 from flowing onto the lower surface of the inner bottom plate portion 212 through the wall surface 612.

In addition, in this motor 11, only one of the conducting wires 521 is arranged in each groove portion 62. Providing a separate groove portion 62 for each conducting wire 521 enables each groove portion 62 to have a reduced width. This leads to increased channel resistance of each individual groove portion 62, which contributes to more effectively preventing the sealant 80 from flowing out from the recessed portion 61 to the connection portion 63 through the groove portion 62.

In this motor 11, the axial position of a lower surface of each projecting portion 64 and the axial position of a lower surface of a remaining portion of the inner bottom plate portion 212 are substantially identical to each other. More specifically, the axial position of the lower surface of each projecting portion 64 and the axial position of a lowermost surface of the remaining portion of the inner bottom plate portion 212 are substantially identical to each other. Thus, insofar as the projecting portion 64 does not protrude below the remaining portion of the inner bottom plate portion 212, the axial dimension of the projecting portion 64 can be maximized. This contributes to more effectively preventing the sealant 80 from flowing out into any groove portion 62.

The volume of the sealant 80 applied to the recessed portion 61 is smaller than a volume obtained by subtracting the volume of the first insulation sheet 71 and the combined volume of all portions of the conducting wires 521 located in the recessed portion 61 from the volume of the recessed portion 61. This allows a surface of the cured sealant 80 to be arranged above the lower surface of the inner bottom plate portion 212 and the lower surface of each projecting portion 64. That is, each projecting portion 64 projects below the surface of the sealant 80. This contributes to preventing the sealant 80 from flowing out of the recessed portion 61 in the step of applying the sealant 80.

2. Example Modifications

While a preferred embodiment of the present invention has been described above, it will be understood that the present invention is not limited to the above-described preferred embodiment.

Figure 5:
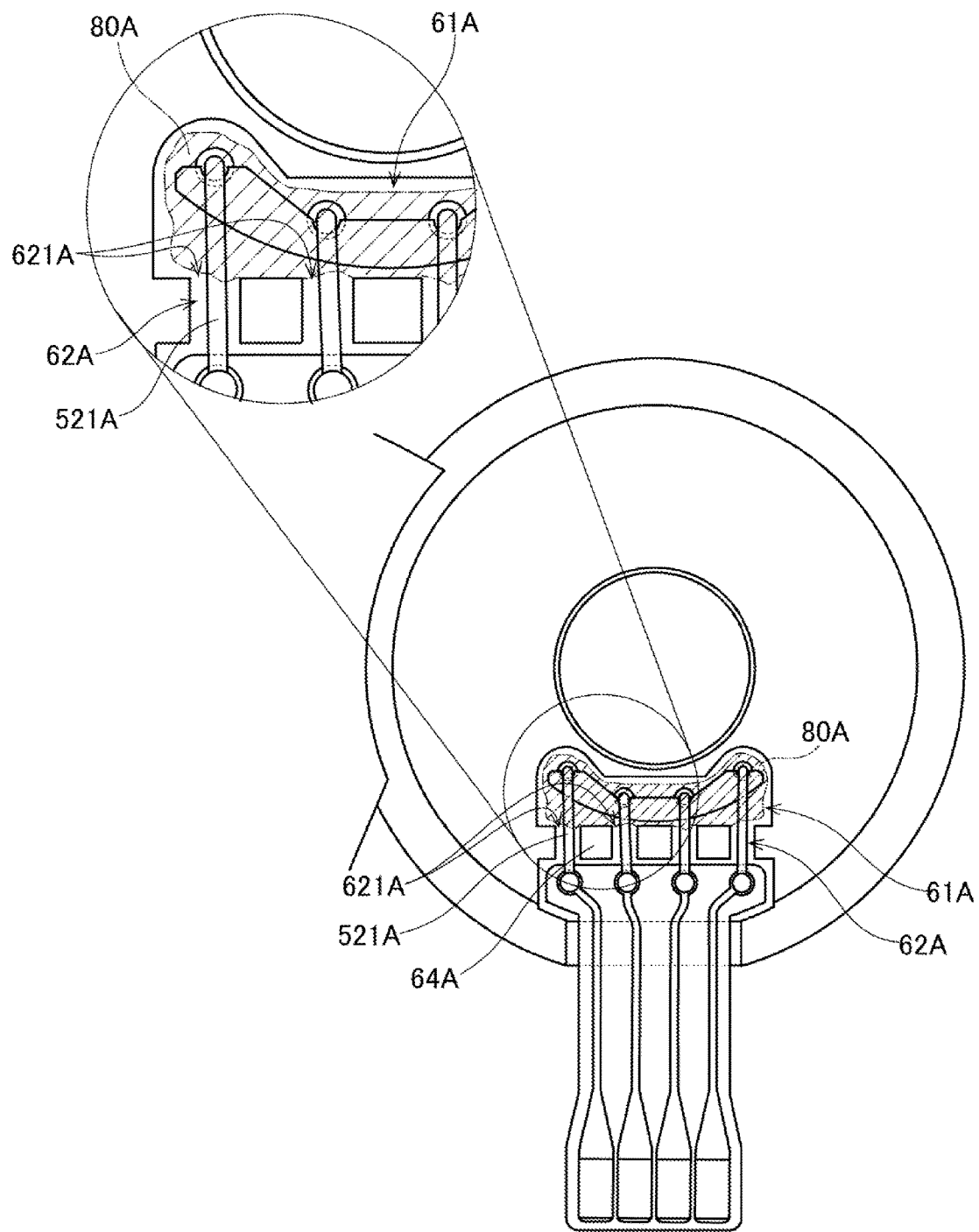
FIG. 5 is a partial bottom view of a base portion according to a modification of the above preferred embodiment of the present invention.

FIG. 5 is a partial bottom view of a motor according to a modification of the above-described first preferred embodiment of the present invention. In the motor according to the modification of FIG. 5, a sealant 80A is arranged to touch an edge portion of each of communicating openings 621A. That is, the sealant 80A is arranged only in a recessed portion 61A and not in any groove portion 62A. In the motor according to the modification of FIG. 5, before the sealant 80A is cured, the sealant 80A is held by surface tension in relation to corner portions of projecting portions 64A which define the edge portions of the communicating openings 621 and portions of surfaces of conducting wires 521A in the vicinity of the communicating openings 621A.

As described above, no sealant may be arranged in each groove portion. Note that the sealant may be arranged in only one or more of the four groove portions and not in the other groove portion(s).

Figure 6:
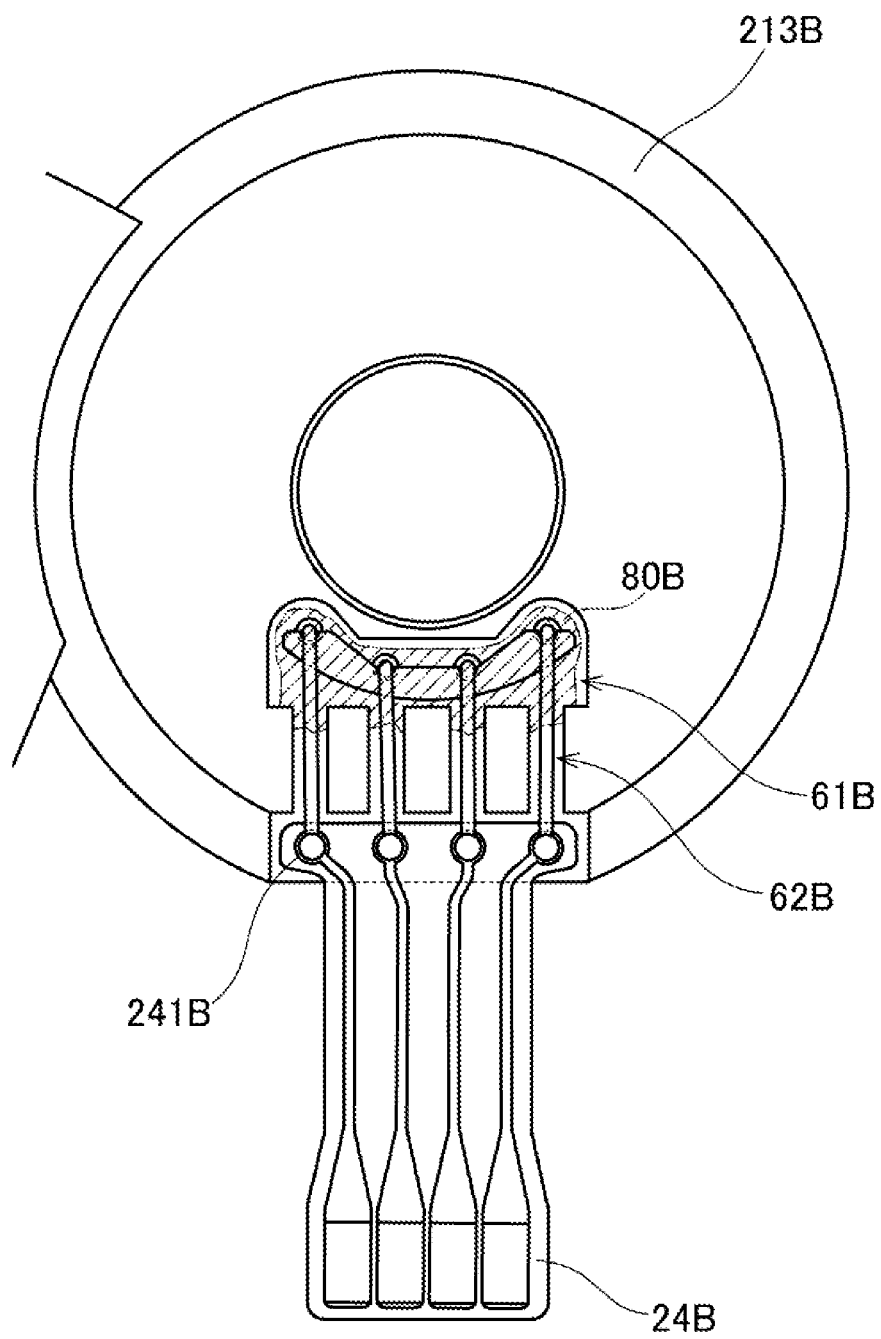
FIG. 6 is a partial bottom view of a base portion according to a modification of the above preferred embodiment of the present invention.

FIG. 6 is a partial bottom view of a motor according to another modification of the above-described first preferred embodiment of the present invention. In the motor according to the modification of FIG. 6, land portions 241B of a circuit board 24B are arranged on a lower surface of an inclined portion 213B. This allows each of groove portions 62B to have a greater length than in the case where the land portions 241B are arranged radially inward of the inclined portion 213B. Thus, the likelihood that a sealant 80B will flow out from a recessed portion 61B through any groove portion 62B is further reduced.

In addition, a connection portion arranged to accommodate a portion of the circuit board 24B is not defined in an inner bottom plate portion, and this allows the inner bottom plate portion to have a thickness greater than that of the inner bottom plate portion 212 of the motor 11 according to the first preferred embodiment.

Figure 7:
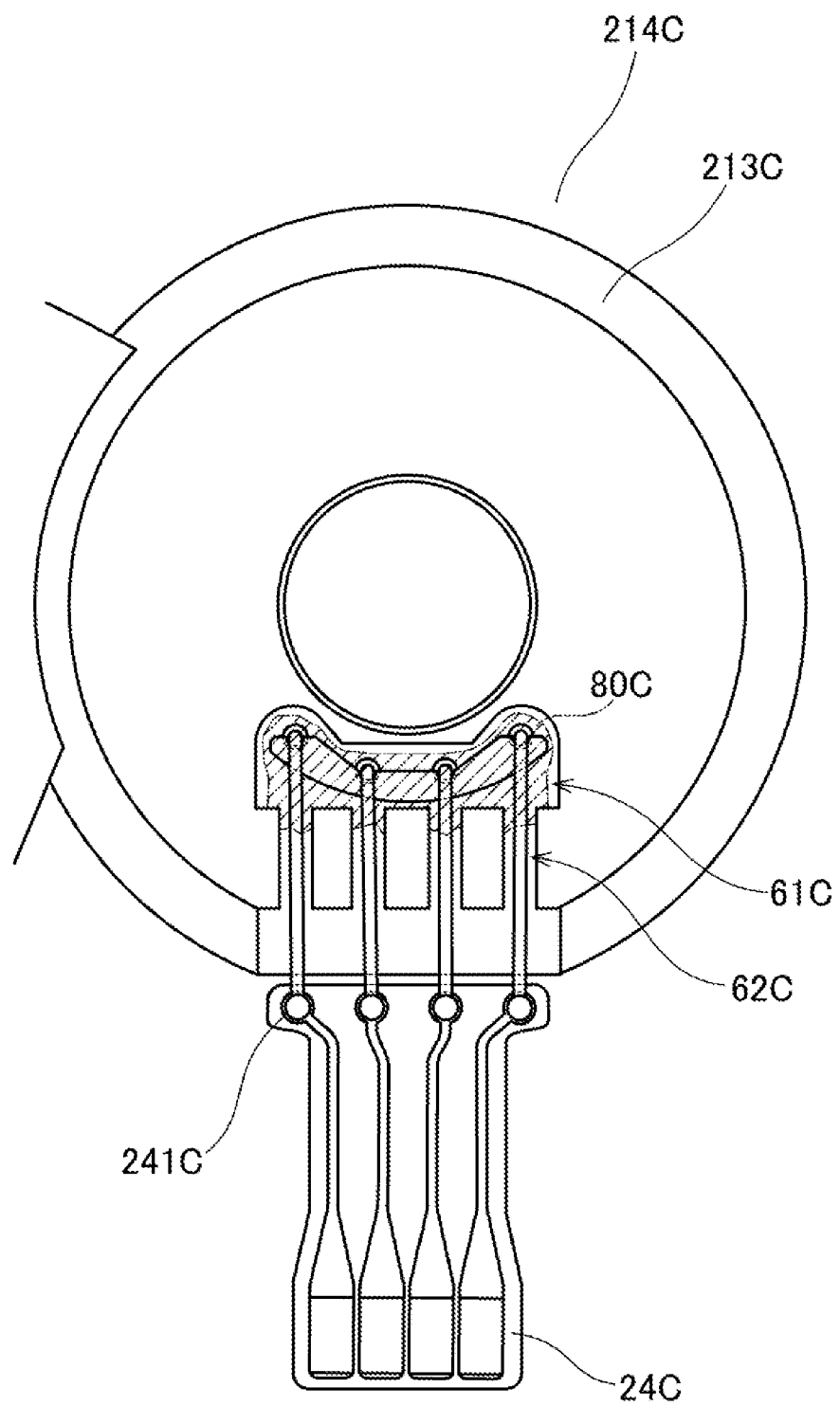
FIG. 7 is a partial bottom view of a base portion according to a modification of the above preferred embodiment of the present invention.

FIG. 7 is a partial bottom view of a motor according to yet another modification of the above-described first preferred embodiment of the present invention. In the motor according to the modification of FIG. 7, land portions 241C of a circuit board 24C are arranged on a lower surface of an outer bottom plate portion 214C. This allows each of groove portions 62C to have a greater length than in the case where the land portions 241C are arranged radially inward of the outer bottom plate portion 214C. Thus, the likelihood that a sealant 80C will flow out from a recessed portion 61C through any groove portion 62C is further reduced. In addition, a connection portion arranged to accommodate a portion of the circuit board 24C is not defined in an inner bottom plate portion, and this allows the inner bottom plate portion to have a thickness greater than that of the inner bottom plate portion 212 of the motor 11 according to the first preferred embodiment.

In addition, in the motor according to the modification of FIG. 7, the circuit board 24C is arranged on a flat surface, and therefore, the circuit board 24C is not bent. This makes it possible to use a material having low flexibility for the circuit board 24C. For example, a rigid board may be used as the circuit board 24C.

Figure 8:
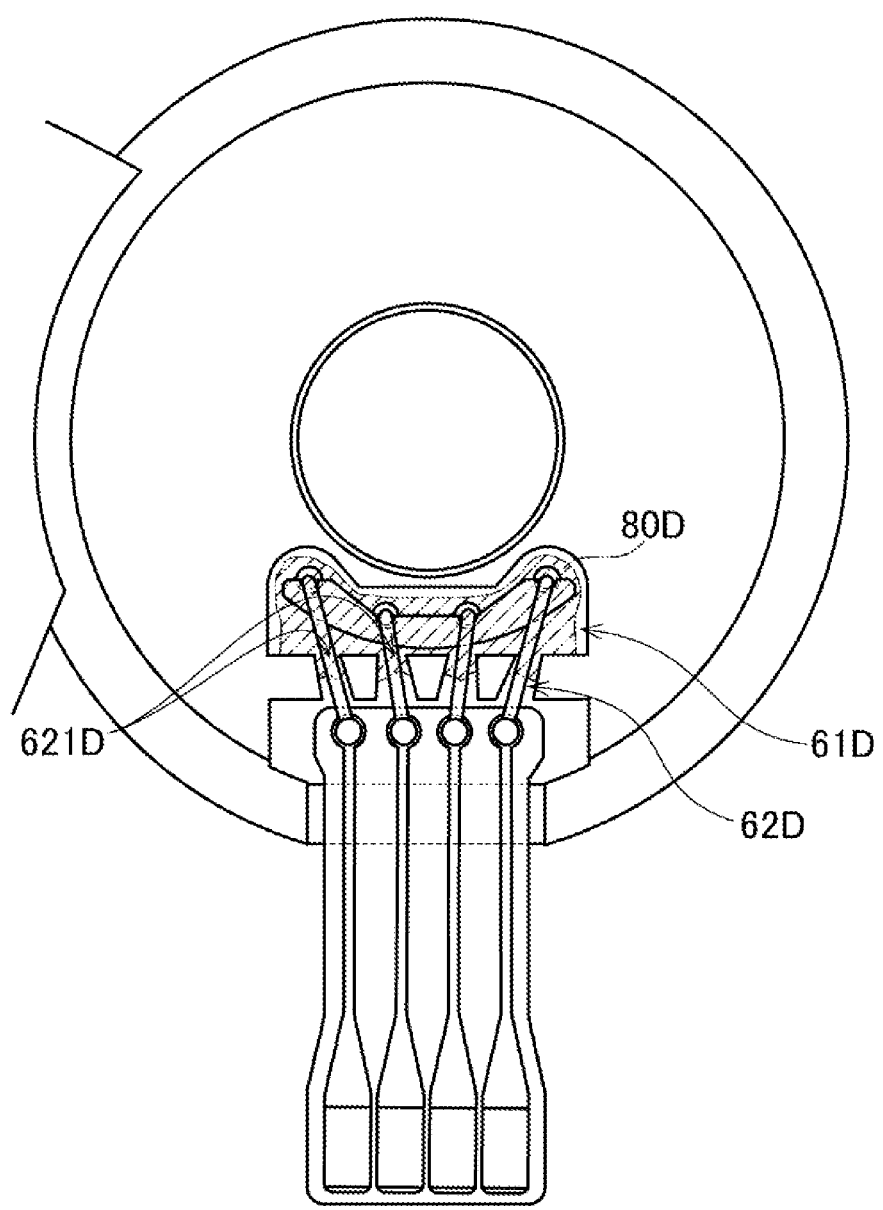
FIG. 8 is a partial bottom view of a base portion according to a modification of the above preferred embodiment of the present invention.

FIG. 8 is a partial bottom view of a motor according to yet another modification of the above-described first preferred embodiment of the present invention. In the motor according to the modification of FIG. 8, the width of each of groove portions 62D is arranged to decrease toward a communicating opening 621D. If a contact angle defined between an uncured sealant 80D and a surface of the groove portion 62D is smaller than 90 degrees when the sealant 80D has flowed out from a recessed portion 61D into the groove portion 62D, a surface of the uncured sealant 80D is attracted toward the communicating opening 621D by surface tension. Thus, the likelihood that the sealant 80D will flow out from the recessed portion 61D through the groove portion 62D is further reduced.

Figure 9:
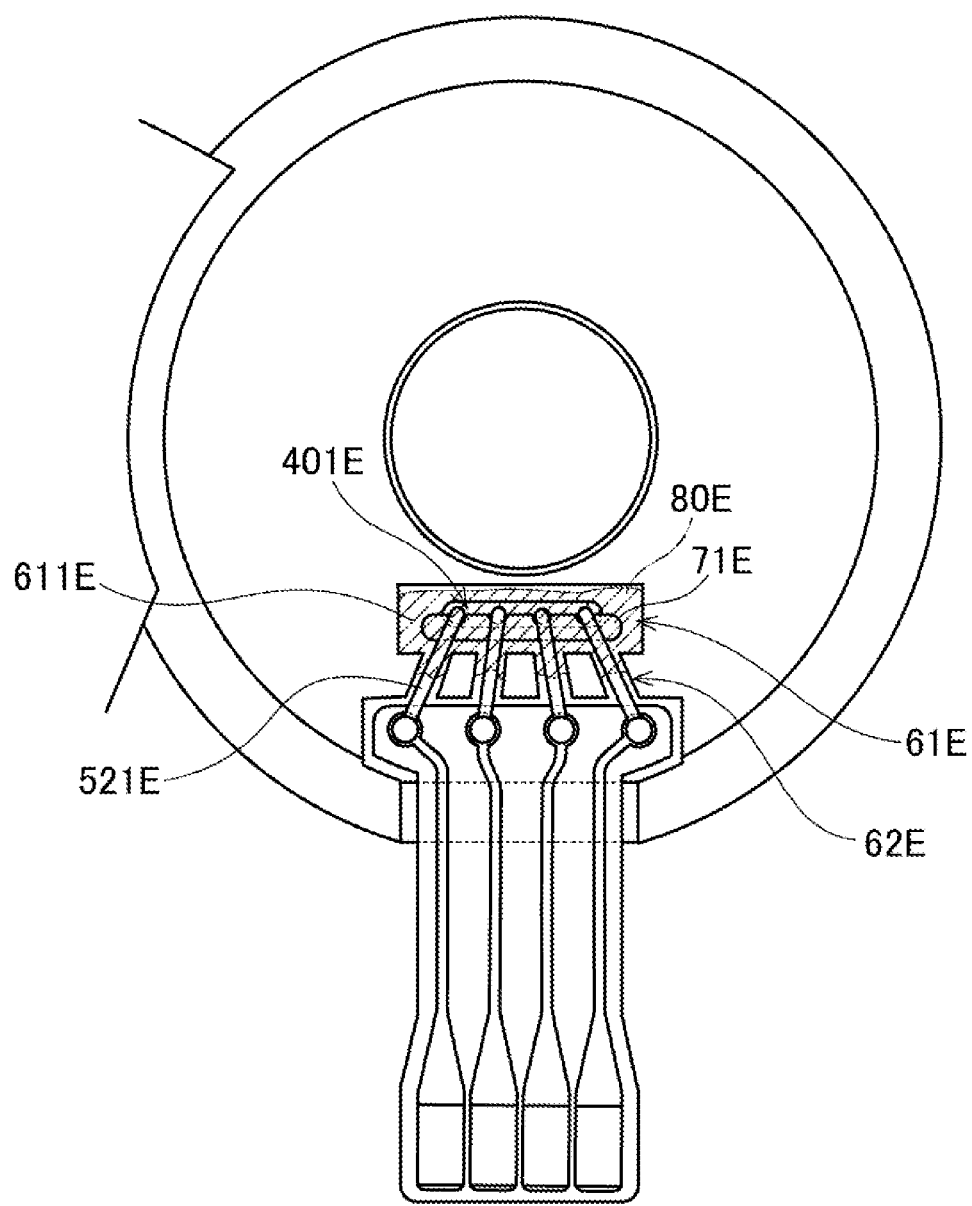
FIG. 9 is a partial bottom view of a base portion according to a modification of the above preferred embodiment of the present invention.

FIG. 9 is a partial bottom view of a motor according to yet another modification of the above-described first preferred embodiment of the present invention. In the motor according to the modification of FIG. 9, a base portion includes a sole through hole. Thus, only one opening 401E (i.e., a lower opening of the through hole) is defined in a draw-out surface 611E of a recessed portion 61E. All four conducting wires 521E are drawn out to the draw-out surface 611E through the opening 401E.

The motor according to the modification of FIG. 9 includes four groove portions 62E. Thus, only one of the conducting wires 521E is arranged in each groove portion 62E. Providing a separate groove portion 62E for each conducting wire 521E as described above enables each groove portion 62E to have a reduced width. This leads to increased channel resistance of each individual groove portion 62E, which contributes to preventing a sealant 80E from flowing out from the recessed portion 61E through the groove portion 62E.

Figure 10:
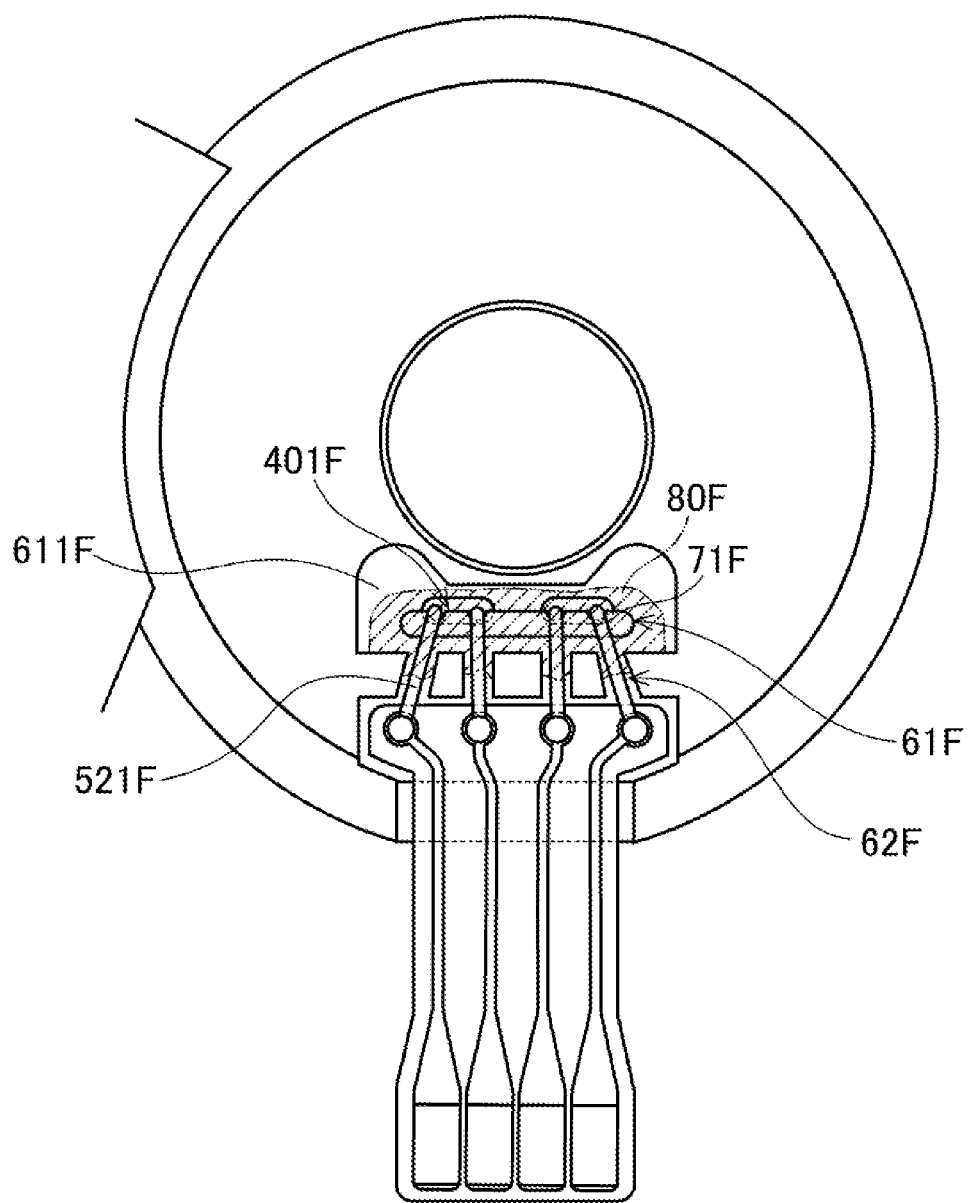
FIG. 10 is a partial bottom view of a base portion according to a modification of the above preferred embodiment of the present invention.

FIG. 10 is a partial bottom view of a motor according to yet another modification of the above-described first preferred embodiment of the present invention. In the motor according to the modification of FIG. 10, a base portion includes two through holes. Thus, two lower openings 401F of the through holes are defined in a draw-out surface 611F of a recessed portion 61F. Two conducting wires 521F are drawn out to the draw-out surface 611F through each opening 401F.

The motor according to the modification of FIG. 10 includes four groove portions 62F. Thus, only one of the conducting wires 521F is arranged in each groove portion 62F. Providing a separate groove portion 62F for each conducting wire 521F enables each groove portion 62F to have a reduced width. This leads to increased channel resistance of each individual groove portion 62F, which contributes to preventing a sealant 80F from flowing out from the recessed portion 61F through the groove portion 62F.

As in each of the modifications of FIGS. 9 and 10, a plurality of conducting wires may be drawn out from above the base portion downwardly of the base portion through one through hole. A single first insulation sheet 71E is arranged on the draw-out surface 611E in the modification of FIG. 9, and a single first insulation sheet 71F is arranged on the draw-out surface 611F in the modification of FIG. 10.

Figure 11:
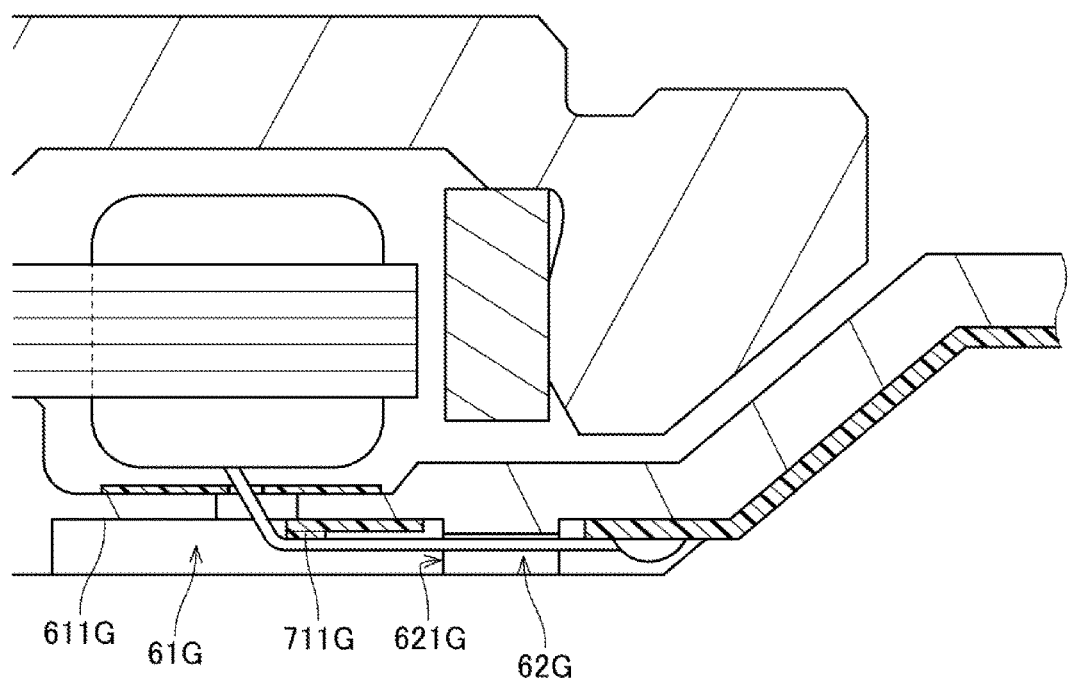
FIG. 11 is a partial vertical cross-sectional view of a motor according to a modification of the above preferred embodiment of the present invention.

FIG. 11 is a partial cross-sectional view of a motor according to yet another modification of the above-described first preferred embodiment of the present invention. In FIG. 11, a sealant is not shown. In the motor according to the modification of FIG. 11, an upper end of a communicating opening 621G of a groove portion 62G is arranged at a level lower than that of a draw-out surface 611G of a recessed portion 61G. This contributes to preventing the sealant, which is applied to the recessed portion 61G in a process of manufacturing the motor and which travels toward the groove portion 62G along the draw-out surface 611G, from flowing into the groove portion 62G through the communicating opening 621G. Thus, the likelihood that the sealant will flow out from the recessed portion 61G through the groove portion 62G is further reduced.

Note that, although the number of conducting wires 521 which are drawn out from the coils 52 downwardly of the base portion 21 through the through holes 40 is four according to the above-described preferred embodiment, the number of conducting wires 521 is not limited to four. For example, only three conducting wires used for the U, V, and W phases, respectively, may be drawn out downwardly of the base portion 21.

Preferred embodiments of the present invention are applicable to a variety of motors. Preferred embodiments of the present invention are applicable to, for example, an outer-rotor motor, an inner-rotor motor, a rotating-shaft motor, a fixed-shaft motor, and the like.

Also note that the sealant used in a preferred embodiment of the present invention is not limited to the thermosetting adhesive. A UV-curing adhesive may be used as the sealant.

In addition, a thermosetting and UV-curing adhesive may be used as the sealant. Also note that the sealant may not necessarily be an adhesive, but may be any other material having an excellent sealing property.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stationary portion; and
a rotating portion supported to be rotatable about a central axis extending in a vertical direction; wherein
the stationary portion includes:
  a metallic base portion including an annular inner bottom plate portion;
  a stator arranged above the inner bottom plate portion; and
  a circuit board arranged on a lower surface of the base portion, and including a plurality of land portions;
the base portion includes:
  a recessed portion recessed upward from a lower surface of the inner bottom plate portion;
  a plurality of groove portions recessed upward from the lower surface of the inner bottom plate portion, and arranged to extend from the recessed portion toward the land portions; and
  at least one through hole arranged to pass through the inner bottom plate portion in an axial direction;
the recessed portion includes:
  a draw-out surface arranged to extend substantially parallel to the lower surface of the inner bottom plate portion at a level higher than that of the lower surface of the inner bottom plate portion, and having a lower opening of each of the at least one through hole defined therein; and
  a wall surface arranged to extend axially downward from a peripheral portion of the draw-out surface;
the wall surface includes a plurality of communicating openings each of which is in communication with one end of a separate one of the groove portions;
a plurality of conducting wires are drawn out from coils of the stator to the draw-out surface through the at least one through hole, and are passed through the communicating openings and the groove portions to be soldered to the land portions;
the recessed portion has a sealant arranged therein; and
the lower opening of each of the at least one through hole is covered with the sealant.

2. The motor according to claim 1, wherein a combined circumferential width of the plurality of groove portions is smaller than a circumferential width of the recessed portion.

3. The motor according to claim 1, wherein
a portion of the sealant is held in the recessed portion, while another portion of the sealant is held in each groove portion; and
the portion of the sealant held in the recessed portion is continuous with the portion of the sealant held in the groove portion.

4. The motor according to claim 1, wherein the sealant is arranged to touch an edge portion of each communicating opening.

5. The motor according to claim 1, wherein the base portion includes, between two circumferentially adjacent ones of the groove portions, a projecting portion arranged to project downward relative to the draw-out surface and upper ends of the groove portions.

6. The motor according to claim 5, wherein a radially inner surface of the projecting portion defines a portion of the wall surface of the recessed portion, and is arranged to extend substantially perpendicularly to the draw-out surface.

7. The motor according to claim 5, wherein the projecting portion is arranged to project downward relative to a surface of the sealant.

8. The motor according to claim 5, wherein an axial position of a lower surface of the projecting portion and an axial position of a lowermost surface of a remaining portion of the inner bottom plate portion are substantially identical to each other.

9. The motor according to claim 1, wherein only one of the conducting wires is arranged in each groove portion.

10. The motor according to claim 1, wherein an interspace between adjacent ones of the communicating openings has a width greater than a width of each communicating opening.

11. The motor according to claim 1, wherein a width of each groove portion is arranged to decrease toward the corresponding communicating opening.

12. The motor according to claim 1, wherein
the stationary portion further includes a first insulation sheet arranged on the draw-out surface; and
the first insulation sheet is arranged to cover a portion of the lower opening of each of the at least one through hole.

13. The motor according to claim 12, wherein
the at least one through hole includes a plurality of through holes;
the lower openings of the plurality of through holes are defined in the draw-out surface, and the first insulation sheet arranged on the draw-out surface is one in number; and
the first insulation sheet is arranged to cover a portion of each of the lower openings of the plurality of through holes.

14. The motor according to claim 12, wherein the sealant is arranged to cover an edge portion of the first insulation sheet.

15. The motor according to claim 1, wherein
the base portion further includes a connection portion recessed upward from the lower surface of the inner bottom plate portion, and joined to an opposite end of each of the groove portions; and
the land portions of the circuit board are arranged in the connection portion.

16. The motor according to claim 1, wherein
the base portion further includes:
an inclined portion arranged to extend obliquely upward and radially outward from an outer edge of the inner bottom plate portion; and
an outer bottom plate portion arranged to extend radially outward from an outer edge of the inclined portion; and
the land portions of the circuit board are arranged on a lower surface of the inclined portion.

17. The motor according to claim 1, wherein
the base portion further includes:
an inclined portion arranged to extend obliquely upward and radially outward from an outer edge of the inner bottom plate portion; and
an outer bottom plate portion arranged to extend radially outward from an outer edge of the inclined portion; and
the land portions of the circuit board are arranged on a lower surface of the outer bottom plate portion.

18. A disk drive apparatus comprising:
the motor of claim 1;
an access portion arranged to perform at least one of reading and writing of information from or to a disk supported by the rotating portion of the motor; and
a housing arranged to accommodate the motor and the access portion.

19. The disk drive apparatus according to claim 18, wherein
the housing includes:
a lower plate portion including the base portion;
a tubular wall portion arranged to extend upward from the lower plate portion; and
an upper plate portion arranged to cover an upper opening of the wall portion; and
an interior space of the housing is filled with a helium gas.

* * * * *